(12) United States Patent  (10) Patent No.: US 8,682,714 B2
Smith et al.  (45) Date of Patent: Mar. 25, 2014

(54) LOCATION ANALYTICS SYSTEMS AND METHODS

(75) Inventors: Kevin G. Smith, Lehi, UT (US); William Brandon George, Pleasant Grove, UT (US)

(73) Assignee: Adobe Systems Incorporated, San Jose, CA (US)

( * ) Notice: Subject to any disclaimer, the term of this patent is extended or adjusted under 35 U.S.C. 154(b) by 154 days.

(21) Appl. No.: 13/115,817

(22) Filed: May 25, 2011

(65) Prior Publication Data

US 2013/0196689 A1  Aug. 1, 2013

(51) Int. Cl.
*G06Q 30/00*  (2012.01)

(52) U.S. Cl.
USPC .......................................................... 705/14.1

(58) Field of Classification Search
USPC .......................................................... 705/14.1
See application file for complete search history.

(56) References Cited

U.S. PATENT DOCUMENTS

2008/0248815 A1* 10/2008 Busch ........................ 455/456.5

* cited by examiner

*Primary Examiner* — Daniel Lastra
(74) *Attorney, Agent, or Firm* — Kilpatrick Townsend & Stockton LLP

(57) ABSTRACT

Provided is a method for assessing effectiveness of a geographic location of interest. The method includes receiving a geographic location of interest, receiving access information including a location corresponding to a geographic location of a visitor at or near a time of the visitor accessing content associated with the geographic location of interest, determining, by a computer, an effectiveness of the geographic location of interest based at least in part on the proximity of the geographic location of the visitor to the geographic location of interest, and storing the effectiveness determined.

21 Claims, 5 Drawing Sheets

| Visit ID | Activity Type | Date | Distance | Geographic Coordinates |
|---|---|---|---|---|
| 1 | Visit | 2011-04-01 | 0.1 mi | 30.263515,-97.736435 |
| 2 | Visit | 2011-04-01 | 0.8 mi | 30.249577,-97.721071 |
| 3 | Purchase | 2011-04-04 | 0.2 mi | 30.262626,-97.742615 |
| 4 | Visit | 2011-04-06 | 0.3 mi | 30.25321,-97.737722 |
| 5 | Purchase | 2011-04-07 | 1.1 mi | 30.246315,-97.714205 |
| 6 | Visit | 2011-04-07 | 0.9 mi | 30.253655,-97.715921 |
| 7 | Visit | 2011-04-08 | 0.9 mi | 30.247353,-97.726307 |
| 8 | Visit | 2011-04-09 | 1.1 mi | 30.242756,-97.720041 |
FIG. 5
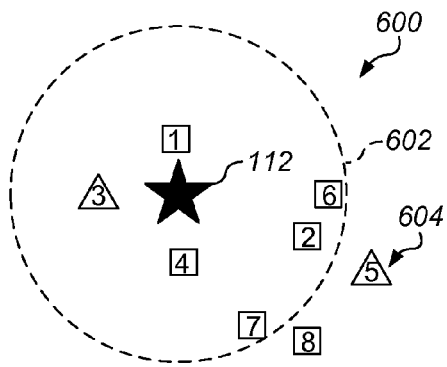
FIG. 6
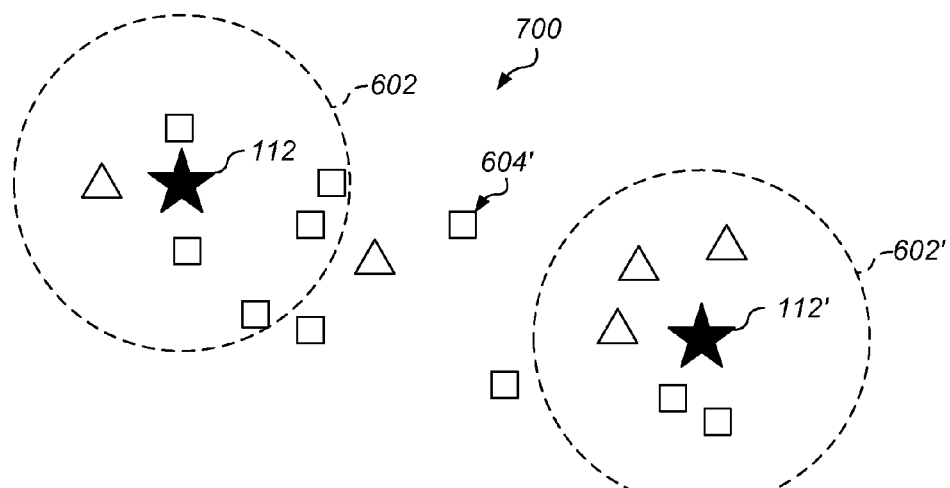
FIG. 7

LOCATION ANALYTICS SYSTEMS AND METHODS

BACKGROUND

Goods and services providers often employ various forms of marketing to drive consumer demand for products and services. Marketing includes various techniques to expose to target audiences to brands, products, services, and so forth. For example, marketing often includes providing promotions (e.g., advertisements) to an audience to encourage them to purchase a product or service. In some instances, promotions are provided through media outlets, such as television, radio, and the internet via television commercials, radio commercials and webpage advertisements. In the context of websites, marketing may provide advertisements for a website and products associated therewith to encourage persons to visit the website, use the website, purchase products and services offered via the website, or otherwise interact with the website. In some instances, promotions are provided at specific geographic locations, such as billboards, visible signs (e.g., storefront banners), in-store displays, presentations, and the like.

Marketing promotions often require a large financial investment. A business may fund an advertisement campaign with the expectation that increases in revenue attributable to marketing promotions exceed the associated cost. A marketing campaign may be considered effective if it creates enough interest and/or revenue to offset the associated cost. Accordingly, marketers often desire to track the effectiveness of their marketing techniques generally, as well as the effectiveness of specific promotions. For example, a marketer may desire to know how many customers visit a website as a result of a particular advertisement. In some instances, marketers simply desire to know how user behavior is affected based on a location, regardless of whether or not a promotion is located there.

In the context of internet advertising, tracking user interaction with a website may be a reliable way of determining an effectiveness of a specific website advertisement. For example, website visitation paths can be tracked to determine how many website visitors "clicked" on a specific advertisement displayed on a webpage and, even further, how many of those visitors took a desired path, such as purchasing a product associated with the advertisement. In the context of other forms of advertisement, however, determining an associated effectiveness may be difficult. For example, there may be no reliable way to attribute a visit to a website and/or corresponding product purchase to a person's exposure to a roadside billboard, a visible sign (e.g., a store-front banner), an in-store display, a presentation, or the like.

Accordingly, it is desirable to provide technique for determining an effectiveness of promotions at specific geographic locations, such as billboards, in-store advertisements, storefront banners, presentations and the like.

SUMMARY

Various embodiments of methods and apparatus for assessing effectiveness of geographic locations and/or physical things (e.g., promotions) at given locations are provided. In some embodiments, provided is method for assessing effectiveness of a geographic location of interest. The method includes receiving a geographic location of interest, receiving access information including a location corresponding to a geographic location of a visitor at or near a time of the visitor accessing content associated with the geographic location of interest, determining, by a computer, an effectiveness of the geographic location of interest based at least in part on the proximity of the geographic location of the visitor to the geographic location of interest, and storing the effectiveness determined.

In some embodiments, provided is a non-transitory computer readable storage medium storing computer-executable program instructions that when executed by a computer are configured to cause: receiving a geographic location of interest, receiving access information including a location corresponding to a geographic location of a visitor at or near a time of the visitor accessing content associated with the geographic location of interest, determining an effectiveness of the geographic location of interest based at least in part on the proximity of the geographic location of the visitor to the geographic location of interest, and storing the effectiveness determined.

In some embodiments, provided is a system including a processor and an index processing module executable by the processor to: receive a geographic location of interest, receive access information including a location corresponding to a geographic location of a visitor at or near a time of the visitor accessing content associated with the geographic location of interest, determine an effectiveness of the geographic location of interest based at least in part on the proximity of the geographic location of the visitor to the geographic location of interest, and store the effectiveness determined.

BRIEF DESCRIPTION OF THE DRAWINGS

FIG. 5 is a table that depicts an exemplary analytics data subset, in accordance with one or more embodiments of the present technique.

FIG. 6 is a map that illustrates an exemplary geographic representation of the analytics data subset of FIG. 5, in accordance with one or more embodiments of the present technique.

FIG. 7 is a map that illustrates an exemplary geographic representation of analytics data for multiple geographic locations of interest, in accordance with one or more embodiments of the present technique.

Figure 1:
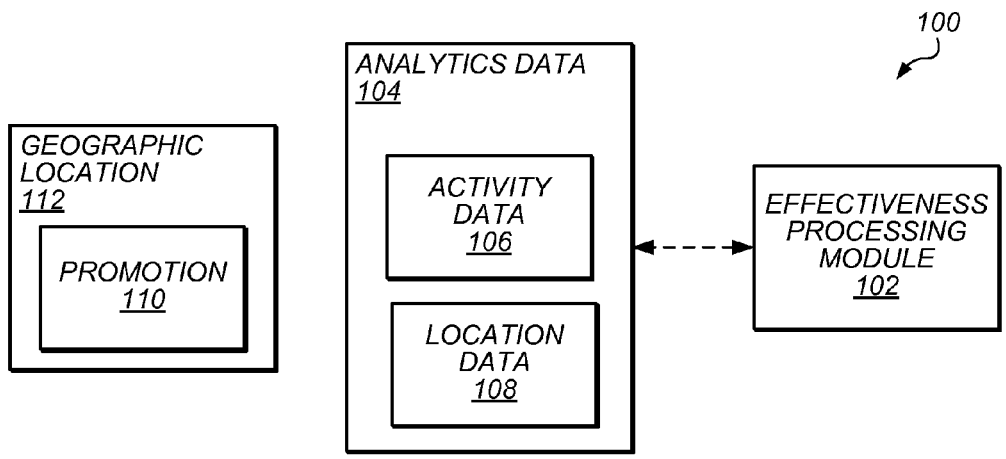
FIG. 1 is a diagram that illustrates an exemplary location assessment system in accordance with one or more embodiments of the present technique.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Headings used herein are for organizational purposes only and are not meant to be used to limit the scope of the description.

DETAILED DESCRIPTION OF EMBODIMENTS

As described in more detail below, provided in some embodiments are systems and methods for assessing an effectiveness one or more geographic locations and/or physical things at the given geographic locations are provided. In some embodiments, the geographic location may include or otherwise be associated with a promotion (e.g., promotional advertisements, promotional presentations, and the like). A promotion may include something at a given location intended to be perceived by a user to influence user behavior. For example, a promotion may include an advertisement for a product. In some embodiments, user behavior is associated with a geographic location and/or a promotion at the geographic location based on the user's physical proximity to the geographic location at or near the time of the observed user behavior. In certain embodiments, for example, a user's website visit is associated with a roadside billboard based on the user's physical proximity to the billboard at the time of the website visit and/or the content accessed by the user during the website visit. In some embodiments, an effectiveness of one or more geographic locations can be assessed based on the behavior and/or location of one or more users relative to the geographic location. In certain embodiments, a geographic location and/or a promotion at a given geographic location may be viewed as effective (or at least more effective) where a greater amount of positive user behavior takes place in close proximity to the corresponding geographic location, whereas a geographic location and/or a promotion may be viewed as ineffective (or at least less effective) where a lesser amount of positive user behavior takes place in close proximity to the corresponding geographic location. In some embodiments, for example, roadside billboard at a given geographic location may be viewed as effective (or at least more effective) where analytics data indicates a large number users visits to a website advertised by the billboard, and the user's are in close proximity to the billboard at or near the time of initiating the website visit and/or during the website visit. In certain embodiments, an effectiveness index is generated for one or more geographic locations and/or promotions at a given geographic location based at least on the proximity of user activity to the geographic location. In some embodiments, user activity may be relevant to the determination of effectiveness if the user activity includes viewing or otherwise attempting to access content related to the geographic location and/or promotion within a geographic region of interest (e.g., a radius) associated with the location. In certain embodiments, user activity may be relevant to the determination of effectiveness if the user activity is related to (e.g., in close temporal proximity) a user involvement with the geographic location and/or promotion. In some embodiments, for example, user activity including viewing or otherwise attempting to access content related to the geographic location and/or promotion within a given time period (e.g., five minutes) of the user being located a within (e.g., driving through) a geographic region of interest (e.g., a radius) associated with the location may be relevant to the determination. In some embodiments, effectiveness indices of multiple locations may be compared to provide comparison of the relative effectiveness of different promotions. In certain embodiments, the effectiveness indices may be rated based on various factors, such as population level/density at or near the geographic location.

In certain embodiments, a user's location may be obtained in association with indications of the user's behavior. In some embodiments, for example, upon visiting a website using a computer device (e.g., a cellular phone, laptop, etc.), information regarding the user's website visit and the user's physical location at the time of the visit is transmitted to an analytics system. In certain embodiments, location information (e.g., geographic coordinates, IP address, etc.) is embedded in or transited along with other data (e.g., analytics data) transmitted from the user's device to the analytics system. In some embodiments, the location information is provided from the user's device. For example, location data may be transmitted from an integral global positioning system (GPS) transceiver of the user's device.

Several of the following embodiments are described with regard to a promotion located a geographic promotion location. For example, techniques are described for determining an effectiveness of a promotion (e.g., a billboard) at a given geographic location. It will be appreciated that the embodiments described herein may be employed to assess and determine the effectiveness of other things. For example, the techniques may be used to assess and determine an effectiveness of a geographic location itself and/or anything corresponding with or otherwise associated with the geographic location (e.g., a brick-and-mortar store location, a nearby business, geographic features, festival, etc.). Accordingly, the described embodiments are not intended to limit the scope of the disclosure, but are intended as descriptions of exemplary embodiments.

FIG. 1 is a diagram that illustrates an exemplary location (e.g., promotion) assessment system 100 in accordance with one or more embodiments of the present technique. System 100 may be employed to assess an effectiveness of one or more promotions at one or more promotion locations. In the illustrated embodiment, system 100 includes an effectiveness processing module 102. Effectiveness processing module 102 may receive and/or process analytics data 104 (e.g., activity data 106 and/or location data 108) to assess an effectiveness of a promotion 110 at geographic location (e.g., promotion location) 112.

Activity data 106 may include data that is indicative of behavior/activity undertaken by one or more users. In some embodiments, activity data 106 may be indicative of a user's access to content via a content site (e.g., website, FTP site, or other source of content accessible via an electronic network). For example, activity data 106 may be indicative of content (e.g., product advertisements, product descriptions or other information) viewed or otherwise accessed by a user during a visit to a website. In some embodiments, activity data 106 includes web analytics data indicative of access to content and other interactions of one or more users with a given website or webpage. For example, activity data may include information regarding webpages visited, links selected, and/or purchases made during a user's navigation through a website. In some embodiments, activity data 106 may be indicative of a user's access to content associated with a given promotion. For example, activity data 106 may indicate that a user accessed a website or other content advertised on a roadside billboard promotion 110 at promotion location 112.

Location data 108 may be indicative of a location of user. In some embodiments, location data 108 may be indicative of a geographic location of a user and/or a device used to access content. For example, location data 108 may include geographic coordinates (e.g., latitude and longitude) of a user and/or a device associated with the user. In some embodiments, a location may be determined based on global positioning coordinates (GPS), a zip code, a reverse lookup based on a device's internet protocol (IP) address, requesting a user's location directly using Hyper-Text Markup Language (HTML) 5, location information provided by a mobile device application running on the device, or the like. Location data may correspond to the location of a user at or near a time of engaging in activity, such as accessing content associated with a promotion. For example location data may be indicative of a location of a user at the time of accessing content associated with promotion 110. Location data 108 may be indicative of a location of a user some time proximate (e.g., before or after) accessing content associated with promotion 110. For example, location data may include a substantially continuous tracking of a user's location as they travel.

Location data 108 may be associated with corresponding activity data 106. In some embodiments, location data 108 corresponding to a given period of time may be associated with activity data 106 that also corresponds to the given period of time. In some embodiments, location data may be indicative of a user's location at or near the time of initiating user activity corresponding to a promotion. For example a geographic location of a user at 12:00 pm may be associated with activity data corresponding to a website visit from 12:00 pm to 12:09 pm when the website is advertised on billboard promotion 112 and the user's location is within one mile of promotion location 112 at 12:00 pm. In some embodiments, location data may be indicative of user activity's association with a geographic location although certain activity (e.g., access of content) may not necessarily occur proximate the location. User activity indicative of the user viewing or otherwise attempting to access content related to promotion 110 may be associated with promotion 110 and/or location 112 where location data 108 indicates that the user engaged in the access within a given period of visiting an area proximate location 112. For example, where a user drove within a one-mile radius of location 112 at 12:00 pm while driving to their place of business, and accessed the content at their place of business at 12:04 pm, the access to content may be associated with location 112 and may be relevant to the determination of effectiveness. Thus, in some embodiments, user activity may be associated with a location if location data indicates that the activity takes place within a geographic region of interest corresponding to the location and/or user activity may be associated with a location if location data indicates that the activity takes place within a temporal proximity of the user interacting with (e.g., driving though) a geographic region of interest corresponding to the location.

Promotion 110 may include a marketing tool (e.g., a physical advertisement or presentation) employed to expose brands, products, services, and so forth to target audiences, to encourage consumer demand for the brands, products, services, and so forth. Promotion location 112 may include a geographic location (e.g., geographical coordinates) where promotion 110 is presented to an audience. For example, a billboard promotion 110 may have fixed latitude and longitude coordinates indicative of promotion location 112.

In some embodiments, promotion 110 may include a visual display via a physical medium at or near promotion location 112. For example a promotion may include a billboard, a sign/banner, in-store display or the like. In the context of websites, promotion 110 may include an advertisement for a website location (e.g., a website address) or products associated with a website in an attempt to encourage persons to visit the website, use the website, purchase products and services offered via the website, or otherwise interact with the website. For example, a billboard promotion 110 at a given geographical location 112 may include an advertisement message suggesting that users visit and interact with given website (e.g., " . . . Register now at www.vendor.com and take a look at our new products for 2011"). In some embodiments, promotion 110 may include a presentation that takes place at or near promotion location 112. For example, promotion 110 may include a live presentation by a sales person at a sales conference, including a demonstration of products, services and the like. Such a presentation may, for example, be given at an auditorium having a given promotion location 112.

As described in more detail herein, activity data 106 may be correlated with location data 108 to attribute user activity to a promotion at a given promotion location, thereby enabling a determination of an effectiveness of the promotion. For example, activity data 106 and associated location data 108 may be used to assess whether or not a user may have responded to a promotion 110 at a given promotion location 112. In some embodiments, effectiveness processing module 102 may generate an effectiveness index indicative of an effectiveness of one or more promotion based on activity data 106 and/or location data 108. Techniques for assessing effectiveness are discussed in more detail below with respect to at least FIGS. 4-8.

In some embodiments, activity data 106 and/or location data 108 maybe acquired from a device used to access content, as depicted and described in more detail below with regard to at least FIG. 2. In some embodiments, activity data 106 and/or location data 108 maybe acquired in association with web analytics data transmitted to a web analytics provider, as depicted and described in more detail below with regard to at least FIG. 3.

Figure 2:
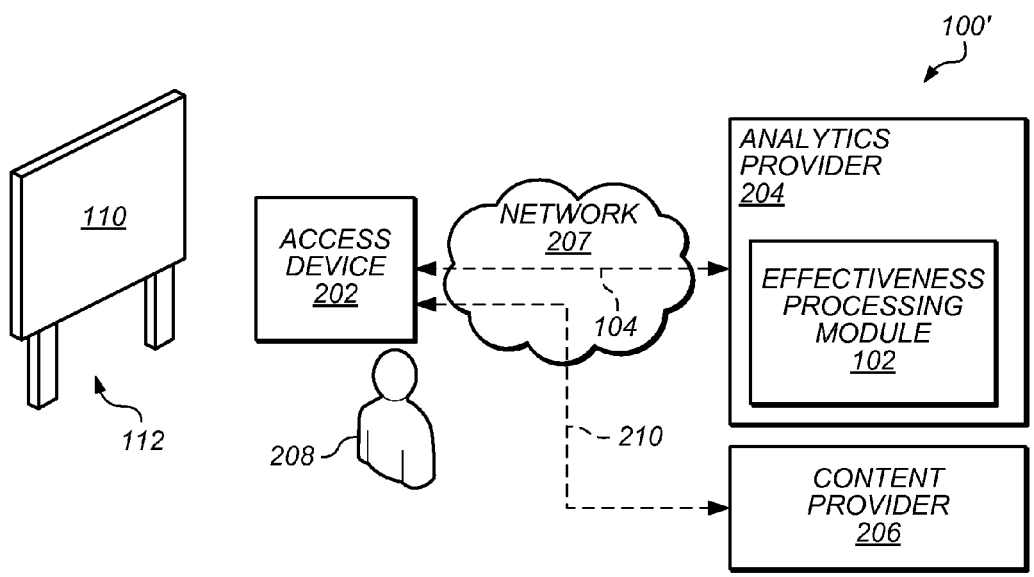
FIG. 2 is a diagram that illustrates an exemplary geographic location assessment system including an access device in accordance with one or more other embodiments of the present technique.

FIG. 2 is a diagram that illustrates an exemplary location (e.g., promotion) assessment system 100' including an access device 202 in accordance with one or more embodiments of the present technique. System 100' may be employed to accumulate and/or process analytics data 104 to assess an effectiveness of one or more promotions (e.g., promotion 110). In the illustrated embodiment, system 100' includes an access device 202, analytics provider 204, and content provider 206, communicatively coupled via a network 207.

Access device 202 may include a computer or similar device employed by a user 208 to interact with devices at various locations on network 207. For example, device 202 may include a personal computer, a cellular phone, a personal digital assistant (PDA), or the like. In some embodiments, access device 202 includes a wireless device. For example, device 202 may include a cellular phone connected to network 206 via a cellular network. Use of a wireless device may enable user 208 to access network 207, and entities connected thereto, from a variety of remote locations.

Network 207 may include a channel for providing effective communication between various entities of system 100'. In some embodiments, network 207 includes an electronic communication network, such as the internet, a local area network (LAN), a cellular communications network, or the like. Network 207 may include a single network or combination of networks that facilitate communication between the entities of system 100'.

In some embodiments, device 202 may include an application that can be used to generate a request for content, to provide content, to render content, and/or to communicate request to various devices on network 208. For example, device 202 may include an internet web-browser or similar application that can be used to transmit/receive data/content 210 via network 208, render data/content 210 on device 202, and/or enable user interaction with content 210 and/or content provider 206.

In some embodiments, device 202 may exchange analytics data 104 with analytics provider 204. For example, access device 202 may transmit activity data 106 and/or location data 108 to analytics provider 204 via network 207 in response to receiving a user request to access content 210 and/or rendering/executing of content 210 (e.g., a webpage) at device 202. In some embodiments, location data 108 is obtained directly from access device 202. For example, access device 202 may include an integrated GPS device that is capable of providing geographical coordinates (e.g., latitude and longitude) indicative of the location of access device 202 and/or user 208. In some embodiments, location information may be obtained via a source external to access device 202. For example, where access device 204 includes a cellular phone, a proxy server for the corresponding cellular network may generate and/or forward activity data 106 and/or location data 108 to analytics provider 202.

In some embodiments, device 202 may include an application that transmits location data 108 to a collection server (e.g., an analytics server or web server of a analytics and/or content provider). For example, device 108 may include an onboard application (e.g., user selected/installed mobile application) that transmits/provides location information such that whereabouts of user 208 may be tracked.

Content provider 206 may include an entity that provides content to various entities and users of system 100'. In some embodiments, content provider 206 host a content site, such as a website, a file transfer protocol (FTP) site, or other source of content accessible via network 207. For example, content provider 206 may include one or more web servers having web pages of a website and/or webpages stored thereon. Content provider 212 may provide content 210 in response to receiving a corresponding request/query. For example, in response to receiving, from access device 202, a user initiated request for a web page, content provider 206 may transmit, via network 207, content 210 including a corresponding HTML file for a webpage that can be rendered on an electronic display of device 202 for display to a user 208. As a result of rendering or otherwise accessing content 210 corresponding analytics data 104 may be transmitted to analytics provider 204 and/or content provider 206.

Analytics provider 204 may provide for the accumulation and/or processing of analytics data to assess an effectiveness of one or more promotions. For example, analytics provider 204 may include effectiveness processing module 102. Effectiveness processing module 102 may provide for acquiring analytics data, including activity data and location data, and determining an effectiveness index for a promotion based on the activity data and/or location data as described in more detail below with regard to FIG. 4. Effectiveness processing module 102 may provide for determining an effectiveness index for multiple promotions, and ranking the promotions based on the determined effectiveness indices, as described in more detail below with regard to FIG. 8.

Figure 3:
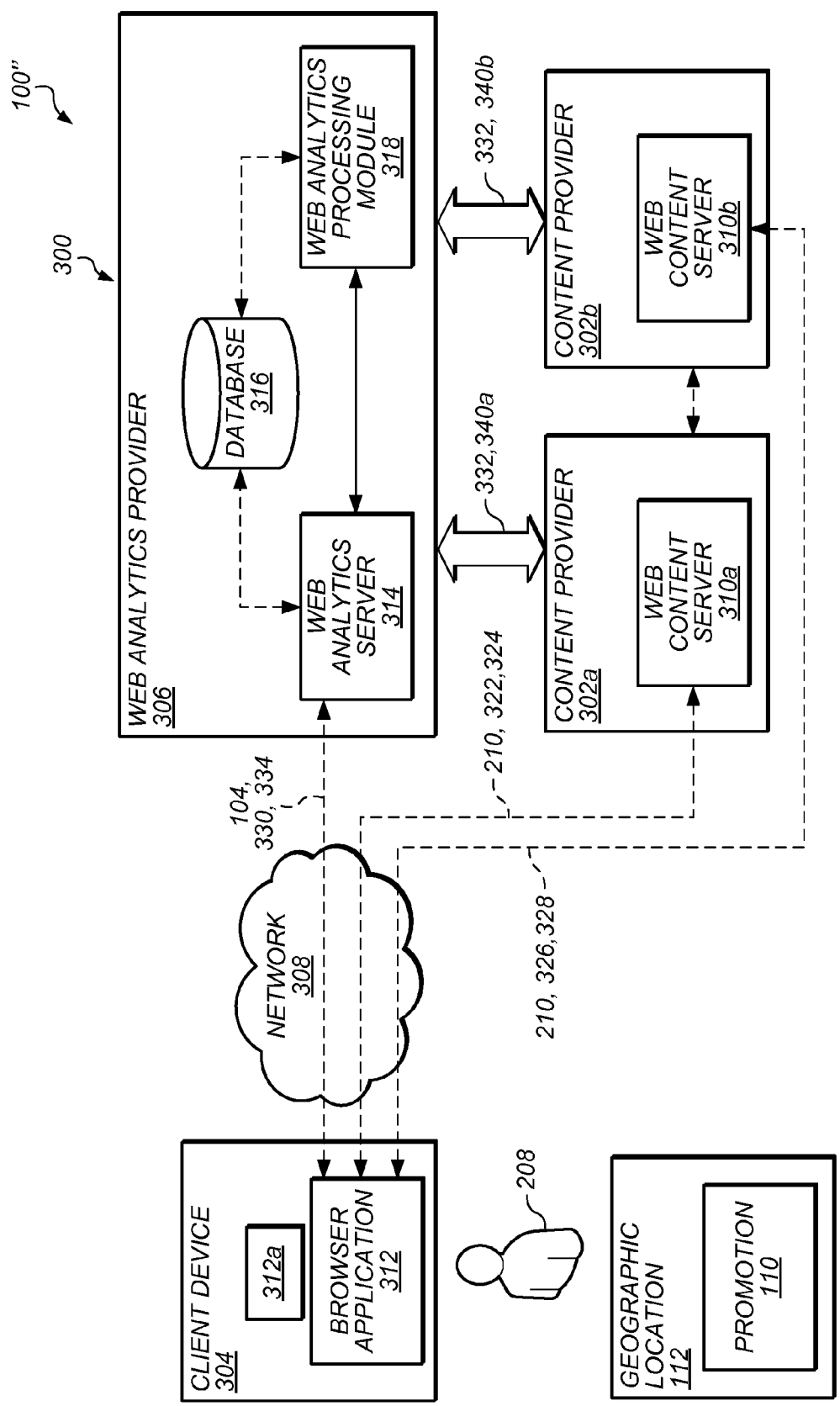
FIG. 3 is a diagram that illustrates an exemplary geographic location assessment system including a web analytics system in accordance with one or more other embodiments of the present technique.

FIG. 3 is a diagram that illustrates an exemplary location (e.g., promotion) assessment system 100" including a web analytics system 300 in accordance with one or more embodiments of the present technique. System 100" may be employed to accumulate and/or process analytics data 104 used to assess an effectiveness of one or more promotions (e.g., promotion 110). In the illustrated embodiment, system 300 includes content providers 302a and 302b, a client device 304 and a web analytics provider 306.

Each of content providers 302a and 302b, client device 304 and web analytics provider 306 may be communicatively coupled to one another via a network 308. Network 308 may include any channel for providing effective communication between each of the entities of system 300. In some embodiments, network 308 includes an electronic communication network, such as the internet, a local area network (LAN), a cellular communications network, or the like. Network 308 may include a single network or combination of networks that facilitate communication between each of the entities (e.g., content providers 302a and 302b, client 304 and web analytics provider 306) of system 300.

In some embodiments, network 308 may be the same as or similar to network 207. In some embodiments, client device 304 may be the same as or similar to access device 202. In some embodiments, content providers 302a and/or 302b may be the same as or similar to content provider 206. In some embodiments, web analytics provider 306 may be the same as or similar to analytics provider 204.

During use, user 208 may employ client device 304 to retrieve content from content providers 302a and/or 302b via network 308. Client device 304 may transmit corresponding analytics data 104 to web analytics provider 306 via network 308. Web analytics provider 306 may employ an effectiveness processing module to assess analytics data 104 and identify an effectiveness of one or more promotions. For example, an effectiveness processing module may determine (e.g., using location data 108) a geographical location of user 208 and/or a client device 304 at or near the time of user 208 engaging in activity with content 210 and/or content providers 302a and/or 302b (e.g., as indicated by activity data 106), The effectiveness module may determine whether or not (or to what extent) to attribute activity data 106 to promotion 110 based on a proximity of user 208 and/or client device 304 to promotion location 112 at or near the time of user 208 engaging the activity. As depicted and described in more detail below with regard to at least FIGS. 4-8, an effectiveness index of one or more promotions may be assessed/determined based on analytics data 104.

Content providers 302a and/or 302b may include source of information/content (e.g., an HTML file defining display information for a webpage) that is provided to client device 304. For example content providers 302a and/or 302b may include vendor websites used to present retail merchandise to a consumer. In some embodiments, content providers 302a and 302b may include respective web content servers 310a and 310b. Web content servers 310a and 310b may include web content 210 stored thereon, such as HTML files that are accessed and loaded by client device 304 for viewing webpages of content providers 302a and 302b. In some embodiments, content providers 302a and 302b may serve client 304 directly. For example, content 210 may be provided from each of servers 310a or 310b directly to client 304. In some embodiments, one of content providers 302a and 302b may act as a proxy for the other of content providers 302a and 302b. For example, server 310a may relay content from server 310b to client device 304.

Client device 304 may include a computer or similar device used to interact with content providers 302a and 302b. In some embodiments, client device 304 includes a wireless device used by user 208 to access content 210 (e.g., web pages of a websites) from content providers 302a and 302b via network 308. For example, client device 304 may include a personal computer, a cellular phone, a personal digital assistant (PDA), or the like. In some embodiments, client device 304 may include an application (e.g., internet web-browser application) 312 that can be used to generate a request for content, to render content, and/or to communicate request to various devices on the network. For example, upon selection of a website link on a webpage displayed to the user by browser application 312, browser application 312 may submit a request for the corresponding webpage/content to web content server 310a, and web content server 310a may provide corresponding content 210, including an HTML file, that is executed by browser application 312 to render the requested website for display to the user. In some instances, execution of the HTML file may cause browser application 312 to generate additional request for additional content (e.g., an image referenced in the HTML file as discussed below) from a remote location, such as content providers 302a and 302b and/or web analytics provider 306. The resulting webpage 312a may be viewed by a user via a video monitor or similar graphical presentation device of client device 304.

Web analytics provider 306 may include a system for the collection and processing of web analytics data 104, and the generation of corresponding web analytics reports including various metrics of the web analytics data (e.g., a promotion effectiveness index and/or a promotion effectiveness ranking) Web analytics data 104 may include data that describes usage and visitation patterns for websites and/or individual webpages within the website. Web analytics data 104 may include information relating to the activity and interactions of one or more users with a given website or webpage. For example, web analytics data 104 may include historic and/or current website browsing information for one or more website visitors, including, but not limited to identification of links selected, identification of web pages viewed, identification of conversions (e.g., desired actions taken—such as the purchase of an item), number of purchases, value of purchases, and other data that may help gauge user interactions with webpages/websites.

In some embodiments, web analytics data 104 includes information indicative of a location. For example web analytics data may include location data 108 indicative of a geographic location of user 208 and/or device 204. In some embodiments, location data 108 may be correlated with corresponding user activity. For example, a set of received web analytics data 104 may include information regarding a user's interaction with a web page (e.g., activity data 106) and corresponding location data 108 indicative of a location of the user and/or client device 304 at the time of the activity. Thus, in some embodiments, web analytics data 104 can be used to assess a user's activity and the corresponding location of the user during the activities. In some embodiments, location data 108 includes geographic location information. For example, location data 108 may include an indication of the geographic coordinates (e.g., latitude and longitude coordinates), IP address or the like or a user or a device.

In some embodiments, web analytics data 104 is accumulated over time to generate a set of web-analytics data (e.g., a web analytics dataset) that is representative of activity and interactions of one or more users with a given website or webpage. For example, a web analytics dataset may include analytics data associated with all user visits to a given website. A corresponding web analytics data subset may include analytics data associated with all user visits to the website within a given time period and occurring with a given proximity (e.g., radius) of a particular geographic location. Web analytics data may be processed to generate metric values that are indicative of a particular trait or characteristic of the data (e.g., a number of website visits, a number of items purchased, value of items purchased, a conversion rate, a promotion effectiveness index, etc.).

Web analytics provider 306 may include a third-party website traffic statistic service. Web analytics provider 306 may include an entity that is physically separate from content providers 302a and 302b. Web analytics provider 306 may reside on a different network location from content providers 302a and 302b and/or client device 304. In the illustrated embodiment, for example, web analytics provider 306 is communicatively coupled to client 304 via network 308. Web analytics provider 306 may be communicatively coupled to content providers 302a and 302b via network 308. Web analytics provider 306 may receive web analytics data 104 from client device 304 via network 308 and may provide corresponding web analytics data (e.g., web analytics reports) to content provider 302a and 302b via network 308 or some other form of communication.

In the illustrated embodiment, web analytics provider 306 includes a web analytics server 314, a web analytics database 316, and a web analytics processing module 318. Processing module 318 may include computer executable code (e.g., executable software modules) stored on a computer readable storage medium that is executable by a computer to provide associated processing. For example, processing module 318 may process web analytics datasets stored in database 316 to generate corresponding web analytics reports that are provided to content providers 302a and 302b. Web analytics processing module 318 may include effectiveness processing module 102. Accordingly, web analytics processing module 318 may assess analytics data 104 to assess an effectiveness of one or more promotions. For example, web analytics processing module 318 may determine (e.g., using location data 108) a geographical location of user 208 and/or a client device 304 at or near the time of user 208 engaging in interaction with content 210 and/or content providers 302a and/or 302b (e.g., as indicated by activity data 106), and may determine whether or not (or to what extent) to attribute activity data 106 to promotion 110 based on a proximity of user 208 and/or client device 304 to promotion location 112 at or near the time of at the time of user 208 engaging in the activity. As depicted and described in more detail below with regard to at least FIGS. 4-7, an effectiveness index of one or more promotions may be assessed/determined based on analytics data 104.

Web analytics server 314 may service requests from one or more clients. For example, upon loading/rendering of a webpage 312a by browser 312 of client device 304, browser 312 may generate a request to web analytics server 314 via network 308. Web analytics server 314 and/or processing module 318 may process the request and return appropriate content (e.g., an image) 210 to browser 312 of client device 304. In some embodiments, the request includes a request for an image, and web analytics provider 306 simply returns a single transparent pixel for display by browser 312 of client device 304, thereby fulfilling the request. The request itself may also include web analytics data embedded therein. Some embodiments may include content provider 302a and/or 302b embedding or otherwise providing a pointer to a resource, known as a "web bug", within the HTML code of the webpage 312a provided to client device 304. The resource may be invisible in to the user 208, such as a transparent one-pixel image for display in a web page. The pointer may direct browser 312 of client device 304 to request the resource from web analytics server 314. Web analytics server 314 may record the request and any additional information associated with the request (e.g., the date and time, and/or identifying information that may be encoded in the resource request).

In some embodiments, an image request embedded in the HTML code of the webpage may include codes/strings that are indicative of web analytics data, such as data about a user/client, the user's computer, the content of the webpage, or any other web analytics data that is accessible and of interest. A request for an image may include, for example, "image.gif/XXX . . . " wherein the string "XXX . . . " is indicative of the web analytics data 104. For example, the string "XXX" may include information regarding user interaction with a website (e.g., activity data 106) as well as location information (e.g., location data 108) identifying a location of the user at or near the time of interaction. Web analytics provider 306 may parse the request (e.g., at server 314 or processing module 318) to extract the web analytics data contained within the request. Web analytics data 104 may be stored in web analytics database 316, or a similar storage/memory device, in association with other accumulated web analytics data. In some embodiments, processing module 318 may receive/retrieve web analytics data from web analytics server 314 and/or database 316. Web analytics processing module 318 may process the web analytics data to generate one or more web analytics reports. For example, web analytics report module 314 may filter the raw web analytics data received at web analytics server 314 to generate concise and complete web analytics reports, as may be requested by a website administrator of one of content providers 302a and 302b. Reports, for example, may include overviews and statistical analyses describing the relative frequency with which various site paths are being followed through the content provider's website, the rate of converting a website visit to a purchase (e.g., conversion), an effectiveness of various promotions, and so forth.

In some embodiments, user 208 interacts with client device 304 to execute a software application, such as browser application 312, for accessing and displaying one or more webpages 312a. In response to a user command, such as clicking on a link or typing in a uniform resource locator (URL), browser application 312 may issue a webpage request 322 to web content server 310a of content provider 302a via network 308 (e.g., via the Internet). In response to request 322, web content server 310a may transmit the corresponding content 210 (e.g., webpage HTML code 324 corresponding to webpage 312a) to browser application 212. Browser application 212 may interpret the received webpage code 324 to display the requested webpage 312a to user 208 at a user interface (e.g., monitor) of client 306. Browser application 312 may generate additional requests for content from the servers, or other remote network locations, as needed. For example, if webpage code 324 calls for content, such as an advertisement, to be provided by content provider 302b, browser application 312 may issue an additional request 326 to web content server 310b. Web content server 310b may provide a corresponding response 328 containing requested content 210, thereby fulfilling the request. Browser application 312 may assemble the additional content for display within webpage 312a.

In some embodiments, client device 304 also transmits webpage visitation tracking information to web analytics provider 306. For example, as described above, webpage code 324 may include executable code (e.g., a web bug) to initiate a request for data from web analytics server 314 such that execution of webpage code 324 at browser 312 causes browser 312 to generate a corresponding request (e.g., a web-beacon request) 330 for the data to web analytics server 314. In some embodiments, request 330 may itself have web analytics data (e.g., web analytics data 104) contained/embedded therein, or otherwise associated therewith, such that transmitting request 330 causes transmission of web analytics data from client 304 to web analytics provider 306. For example, as described above, request 330 may include an image request having an embedded string of data therein. Web analytics provider 306 may process (e.g., parse) request 330 to extract web analytics data 104 contained in, or associated with, request 330. In some embodiments, request 330 from client 304 may be forwarded from server 314 to database 316 for storage and/or to web analytics processing module 318 for processing. Web analytics processing module 318 and/or server 314 may process the received request to extract web analytics data 104 from request 330. Where request 330 includes a request for an image, web analytics server 314 may simply return content/image 334 (e.g., a single transparent pixel) to browser 312, thereby fulfilling request 328. In some embodiments, web analytics server 306 may transmit web analytics data (e.g., web analytics data 104) and/or a corresponding web analytics reports to content providers 302a and/or 302b, or other interested entities. For example, web analytics data 332 and/or web analytics reports 340a and 340b (e.g., including processed web analytics data) may be forwarded to site administrators of content providers 302a and 302b via network 308, or other forms of communication. In some embodiments, a content provider may log-in to a website, or other network based application, hosted by web analytics provider 306, and may interact with the website/application to generate custom web analytics reports. For example, content provider 302a may log into a web analytics website via website server 314, and may interactively submit request 342 to generate reports for various metrics (e.g., number of conversions for male users that visit the home page of the content provider's website, an effectiveness of a promotion, etc.), and web analytics provider 306 may return corresponding reports (e.g., reports dynamically generated via corresponding queries for data stored in database 316 and processing of the data via module 318). In some embodiments, content providers 302a and 302b may provide web analytics data 104 to web analytics provider 306.

In some embodiments, reports may include one or more metric values that are indicative of a characteristic/trait of a set of data. For example, a report may include an effectiveness index metric that represents an effectiveness of a promotion based on analytics data 104 received. The effectiveness index metric may be generated by processing (e.g., filtering) a large web analytics dataset to identify relevant analytics data that meets a specified criteria (e.g., includes website visits to one or more specified websites, that include a specified type of activity, that occurred within a specified time period, and/or that occurred within a specified geographical region). The relevant analytics data identified may be further processed to generate an effectiveness index metric for one or more promotion location, to rank an effectiveness of a plurality of promotions, and the like. As described herein, the effectiveness index and/or ranking may be used to assess the effectiveness of various promotions and/or as a basis for various business decisions. For example, a promotion may be continued, expanded in scale, reduced in scale, duplicated, terminated and/or maintained at a similar level based on the determined effectiveness. Effectiveness may be determined using various techniques, as described in more detail below with regard to at least FIGS. 6 and 7.

Figure 4:
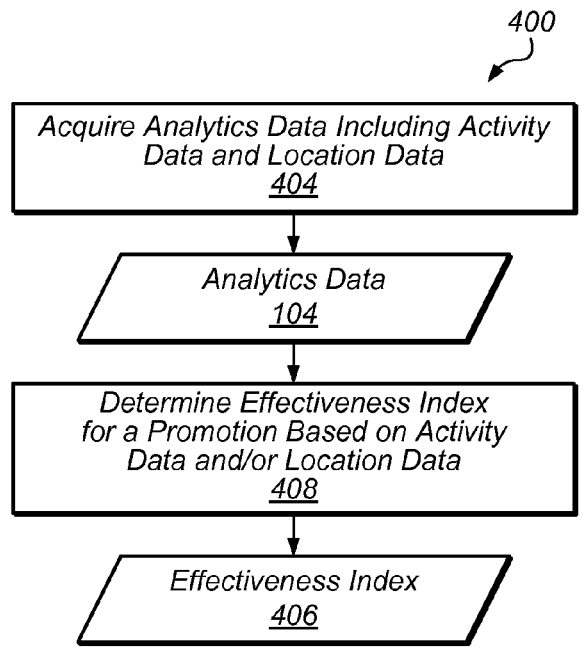
FIG. 4 is a flowchart that illustrates a method of assessing effectiveness of a geographic location of interest in accordance with one or more embodiments of the present technique.

FIG. 4 is a flowchart that illustrates a method 400 of assessing effectiveness of a geographic location of interest (e.g., promotion 110 at promotion location 112) in accordance with one or more embodiments of the present technique. Method 400 generally includes acquiring analytics data (e.g., including activity data and location data), and determining an effectiveness index for a promotion based on the activity data and/or location data. Some or all of method 600 may be implemented by effectiveness processing module 102.

Method 400 may include acquiring analytics data (e.g., activity data 104) that includes activity data and location data, as depicted. As described above, analytics data 104 may be acquired in a verity of manners. For example, analytics data 104 may be acquired from device 202 and/or client device 304, as depicted and described with respect to FIGS. 2 and 3. Analytics data 104 may include activity data 106 and/or location data 108.

In some embodiment, acquiring analytics data 104 may include accumulating the analytics data from one or more users over an extended period of time. For example, analytics data 104 may be collected from a plurality of users and/or user devices over a day, month, week year, decade, etc. to generate a corresponding analytics dataset for the time period. In some embodiments, acquiring analytics data may include receiving a raw analytics data to generate a full analytics dataset that includes analytics data for all activities being tracked. For example, a full analytics dataset may include analytics data 104 corresponding to visits to a plurality of different websites without limitation on the type of activity and/or the location of the activity.

In some embodiments, acquiring analytics data may include filtering an analytics dataset to generate a subset of analytic data. For example, where visits to a website within a specified region over a specified period of time are to be considered in processing an effectiveness of a promotion, an analytics dataset or data subset may be filtered to generate a relevant subset of analytics data 104 that includes activity data 106 and corresponding location data 108 indicative of visits by a plurality of users to the website within the specified region and during the specified time period. In the exemplary instance of a determining an effectiveness for a promotion including a billboard promotion 110 at a promotion location 112 having geographic coordinates of latitude 30.260846, longitude −97.736006, and including an advertisement suggesting that users visit and interact with given website (e.g., " . . . Register now at www.vendor.com and take a look at our new products for 2011"), acquiring analytics data may include generating or otherwise receiving a subset of accumulated analytics data corresponding to user visits to the website "vendor.com" over a given period of time.

In some embodiments, various segments of data may be identified as relevant to the determination of an effectiveness index. For example, in some embodiments, analytics data may be associated with a user identification (e.g., visitor ID), and various segments of data may be generated based on one or more visits by a user. Exemplary visitor segments of data may include: (1) visitors that visited the location/content a given number of times (e.g., five or more times, only one time, and so forth), (2) visitors that visited the location/content a given number of times within a given period (e.g., two times in one day, five or more times in one week, one time per day during the times of 6 pm to 9 pm three consecutive days, and so forth), (3) visitors that visited associated content, but were not proximate the geographic location of the promotion (e.g., visited the associated website, but were not proximate the geographic location of the promotion), and so forth). In some embodiments, analytics data relevant to the determination of an effectiveness index may include using data (e.g., filtered analytics data) that meets the requirements for the visitor segments.

FIG. 5 is a table 500 that depicts exemplary analytics data subset (e.g., dataset) 502, in accordance with one or more embodiments of the present technique. Dataset 502 may be representative of a segment of data that include at least one visit by users to the website "www.vendor.com" within a two mile radius of a billboard located latitude 30.260846, longitude −97.736006, the visits occurring during the time period of Apr. 1, 2011 to Apr. 9, 2011. Each line of line of data 502 may include analytics data corresponding to a particular user visit to the website "www.vendor.com". Each line may be uniquely identified by a visit identifier (ID) (e.g., Visit ID "1"-"8"). In some embodiments, the visit ID may identify the visitor. For example, the exemplary listing of data may include visits by eight different users. Analytics data for each listed visit may include an identification of a corresponding type of activity (e.g., "Activity Type") and/or geographic location (e.g., "Geographic Coordinates") corresponding to the associated visit. "Activity Type" may be indicative of a type of activity that took place during the associated visit. For example, a "Visit" activity type may indicate that the user merely visited the website but did not purchase any products or services offered for sale by the website. A "Purchase" activity type may indicate that the user did purchase one or more products or service offered for sale by the website during their visit. The activity type may be extracted form or otherwise determined based on activity data 106 received with analytics data 104. "Geographic Coordinates" may be indicative of a physical geographic location of the user at the time of the website visit. For example, the geographic coordinates may include a longitude and latitude indicative of the location of user 208 and/or device 202 or 304 at the time of the website visit. "Geographic Coordinates" may be indicative of a physical geographic location of the user proximate the time of the website visit. For example, the geographic coordinates may include a longitude and latitude indicative of the user's location of user 208 and/or device 202 or 304 within a region interest (e.g., one-mile radius) shortly before the time of the website visit (e.g., within five minutes of the website visit). The geographic coordinates may be extracted from or otherwise determined based on location data 108 received with analytics data 104.

In some embodiments, analytics data for each listed visit may include an identification of a "Distance" corresponding to the associated visit. The "Distance" may be indicative of a physical distance between the location of the user at the time of the website visit and the physical location of a promotion to be evaluated. For example, the distance may include a distance from the geographic coordinate location of the billboard promotion and the geographic coordinate location for the particular website visit. In some embodiments, the distance may be calculated for use in assessing the effectiveness index.

FIG. 6 is a map 600 that illustrates an exemplary geographic representation of dataset 502 of FIG. 5, in accordance with one or more embodiments of the present technique. In the illustrated embodiment, the star corresponds to a geographic location of interest (e.g., promotion location 112 for the billboard promotion 110). Each of the visits to website "www.vendor.com" is represented by a corresponding marking (e.g., numeral/shape pair) 604 located a distance from the star/location 112. The numeral corresponds to visit identifiers (e.g., Visit ID "1"-"8") for each particular visit, and the surrounding shape corresponds to the activity type for each particular visit. For example, markings 604 associated with a website visit having a "Visit" activity type include a square surround and markings 604 associated with a website visit having a "Purchase" activity type include a triangle surround. In the illustrated embodiment, a dashed-circular boundary (e.g., "geographic-fence") 602 is provided at a radius (e.g., corresponding to a distance of one mile) from location 112. As discussed in more detail below, boundary 602 may define a bounded region of interest (ROI) used for computing an effectiveness index.

In some embodiments, multiple promotion locations may be considered simultaneously. FIG. 7 is a map 700 that illustrates an exemplary geographic representation of analytics data for multiple geographic locations of interest (e.g., promotion locations 112 and 112'), in accordance with one or more embodiments of the present technique. Promotion locations 112 and 112' may include locations of promotions (e.g., billboards) that are located approximately three miles form one another. Each of the billboards may include an advertisement suggesting that users visit and interact with given website (e.g., " . . . Register now at www.vendor.com and take a look at our new products for 2011"). Each of the visits to website "www.vendor.com" is represented by a corresponding marking (e.g., shape) 604' located a distance from the star/location 112. The shape of each marking 604' corresponds to the activity type for each particular visit. For example, markings 604' associated with a website visit having a "Visit" activity type include a square surround and markings 604' associated with a website visit having a "Purchase" activity type include a triangle surround. In the illustrated embodiment, dashed-circular boundaries 602 and 602' are provided at a radius (e.g., corresponding to a distance of one mile) from location 112 and 112', respectively. As discussed in more detail below, boundaries 602 and 602' may define a bounded region of interest (ROI) used for computing an effectiveness index.

In some embodiments, map 600 and/or map 700 may be generated for viewing by a user. For example, map 600 and/or map 700 may be generated on a user display as depicted in FIGS. 6 and 7. In some embodiments, maps 600 and 700 may be dynamically updated to correspond to an analytics dataset. For example, as user specifications for filtering an analytics data set are changed (e.g., the relevant activity type is specified as purchase only) and dataset 502 is updated to reflect the filtered subset, (e.g., map 600 may be updated to display only the numeral/shape pairs corresponding to visits "3" and "5" and/or map 700 may be updated to display only the triangular shapes corresponding to visits having a "Purchase" activity type).

In some embodiments, a boundary may provide a visual indication of a distance from a location of interest. For example, boundary 602 may enable a user to readily identify activity that occurs inside and outside of a given radius (e.g., one mile) of location 112. In some embodiments, a plurality of boundaries may be displayed. For example, a second boundary may be displayed that is representative of a greater (e.g., two mile) radius about location 112. Such incremental demarcations may enable a user to readily identify relative locations of data/activity.

In some embodiments, a boundary (e.g., geographic-fence) may be indicative of a region that differentiates between data that is relevant to an effectiveness assessment and data that is not relevant to the assessment. For example, a boundary 602 corresponding to a one mile radius about location 112 may be indicative of user specification that activity (e.g., website visits) that occur at or within a one mile radius are to be considerer with regard to the assessment of an effectiveness index, whereas activity outside of the one mile radius are excluded (e.g., not to be considered) with regard to the assessment. Thus, for example, only visits corresponding to visit ID's "1"-"4", "6" and "7" would be considered for calculating an effectiveness index of a promotion 110 at location 112, based on specified boundary 602.

In some embodiments, a location, size, shape and/or number of boundaries may be user selectable. For example, a user may specify a radius interest and a corresponding boundary may be illustrated. In some embodiments a boundary may be specified using a shape tool, lasso tool, a free form tool, or any variety of selection tools that enable the user to specify the location, size and shape of the boundary. In some embodiments, a plurality of boundaries may be specified. For example, two unique regions may be specified such that activity/data corresponding to locations within each of the two boundaries may be considered for the assessment of an effectiveness index for a given promotion location.

Method 400 may include determining an effectiveness index 406 for a location (e.g., promotion), as depicted at block 408. In some embodiments, an effectiveness index for a promotion may be generated or modified to reflect a high level of effectiveness where the analytics data is indicative of a positive user activity that occurs in close proximity to (e.g., within a given radius of) the promotion location. For example, where analytics data (e.g., dataset 502) indicates one or more user visits to and/or purchases made via the website "www.vendor.com" within in a one mile radius of the billboard suggesting that users visit and interact with the website "www.vendor.com", it may be determined that the billboard is having a positive effect on driving consumers to the website "www.vendor.com" and, thus, an effectiveness index associated with the billboard may be generated or adjusted to reflect the positive effect on driving consumers to the website. In contrast, an effectiveness index for a promotion may not be modified, or may be modified to reflect a lower effectiveness, where the analytics data is not indicative of a positive user activity in close proximity to the promotion the promotion location. For example, where no visits to the website "www.wendor.com" are recorded within one-mile of the promotion location of the billboard suggesting that users visit and interact with the website "www.vendor.com", it may be determined that the billboard is not having a positive effect on driving consumers to the website "www.vendor.com" and, thus, the effectiveness index associated with the billboard may reflect the lack of positive effect on driving consumers to the website"www.vendor.com".

Determining an effectiveness index may be accomplished in a variety of manners. For example, an effectiveness index may be determined based on the quantity of activity, a type of activity, proximity of activity to a promotion location, or any combination thereof. Specifications for how an effectiveness index is to be determined may be provided by a user. For example, a user may specify that activity to be considered relate to a type of content (e.g., a particular website), a type of activity (e.g., website visits and purchases), a geographical region of interest (e.g., within a one mile radius of a billboard), a time frame (e.g., during the time period of Apr. 1, 2011 to Apr. 9, 2011), weighting of data (e.g., assign higher weight to activities of a purchase type and assign higher weights to activity that occurs closer to promotion location 110), and so forth. The specifications may be used to filter analytics data, as described with respect to block 404, or may be used as a direct basis for applying analytics data in the determination of effectiveness index 406.

In some embodiments, effectiveness index 610 may be calculated based on a quantity of relevant user activity. For example, with regard to analytics data 502 of FIG. 5 and the corresponding map 600 of FIG. 6, each instance of user activity may be assigned a value of "1" and the values may be totaled to provide an effectiveness index value of "8". Accordingly, in some embodiments, all activity data for user visits to the website "www.vendor.com" may be relevant to the determination of effectiveness index 610, weighted equally, and may not be subject to exclusion due to distance from the promotion location.

In some embodiments, effectiveness index 610 may be calculated based on a quantity of relevant user activity that occurs within a specified region. The specified region (e.g., region of interest) may be identified by a boundary. For example, activity data associated with a location that falls within a given region (e.g., within a one mile radius of promotion location 112) may be considered in the calculation of effectiveness index 406, whereas activity data associated with a location that falls outside of the given region may not be considered in the calculation of effectiveness index 406. In some embodiments, a boundary may be user specified (e.g., a boundary specified/selected via a user display as discussed above). With regard to analytics data 502 of FIG. 5 and the corresponding map 600 of FIG. 6, and a specification that relevant activity data may include activity data associated with a location that falls within a one mile radius (e.g., boundary 602) of promotion location 112, each instance of user activity that occurs within a one mile radius of promotion location 112 (e.g., having an associated "Distance" of one mile or less) may be identified as relevant to the determination and may be assigned a index value of "1". The relevant index values may be totaled to provide an effectiveness index value of "6". Notably, activity data corresponding to visit ID's "5" and "8" may be identified as irrelevant to the determination due to their "Distance" from promotion location 112 falling outside of the specified one mile radius (e.g., exceeding the threshold distance of one mile) and, thus, may not be factored into the determination of effectiveness index 610. Accordingly, in some embodiments, activity data for user visits to the website "www.vendor.com" may be determined to be irrelevant to the determination of effectiveness index 610 due to a distance from the promotion location.

In some embodiments, effectiveness index 610 may be calculated based on a weighting of relevant user activity. In some embodiments, user activity's impact on effectiveness index 610 may be weighted based on the activity's proximity to promotion location 112. For example, user activity that occurs closer to promotion location 112 may be assigned more weight than user activity that occurs farther way from promotion location 112. With regard to analytics data 502 of FIG. 5 and the corresponding map 600 of FIG. 6 and a specification that the weighting of an activity in inversely proportional to its distance from a promotion location, each instance of user activity may be assigned an index value that is equal to the inverse of its distance (e.g., visit ID "1" has an index value of 1/0.1, visit ID "2" has an index value of 1/0.8, and so forth). The index values may be totaled to provide an effectiveness index value of about "23.6". Accordingly, in some embodiments, all of the activity data for user visits to the website "www.vendor.com" may be relevant to the determination of the effectiveness index 610, weighted based on their proximity to the promotion location, and may not be subject to exclusion due to their distance from the promotion location.

In some embodiments, user activity's impact on effectiveness index 610 may be weighted based on an associated type of user activity. For example, activity having a "Purchase" type may be assigned more weight than activity associated with a less desirable activity type, such as a "Visit" type. With regard to analytics data 502 of FIG. 5 and the corresponding map 600 of FIG. 6 and a specification that user activity associated with an activity type of "Purchase" be assigned a weighting that is twice that user activity associated with an activity type of "Visit", an index for each instance of user activity having a type of "visit" may be assigned a value of "1" and an index for each instance of user activity having a type of "purchase" may be assigned a value of "2". The index values may be totaled to provide an effectiveness index value of "10". Accordingly, in some embodiments, all of the activity data for user visits to the website "www.vendor.com" may be relevant to the determination of the effectiveness index 610, weighted based on their activity type, and may not be subject to exclusion due to their distance from the promotion location.

In some embodiments, effectiveness index may be determined based on a combination of one or more of the techniques described herein. For example, a user may specify that activity relevant to the determination of effectiveness index 610 may be limited to activity that occurs within a specified region, and may be subject to weighting based on based the type and/or location of the user activity. With regard to analytics data 502 of FIG. 5 and the corresponding map 600 of FIG. 6 and a specification that (1) relevant activity data may include activity data associated with a location that falls within a one mile radius (e.g., boundary 602) of promotion location 112, (2) the weighting of an activity is inversely proportional to its distance from a promotion location and (3) user activity associated with an activity type of "Purchase" be assigned a weighting that is twice that of a weighting for user activity associated with an activity type of "Visit", (a) each instance of user activity that occurs within a one mile radius of promotion location 112 and having a type of "Visit" may be identified as relevant and may be assigned a index value of "1" divided by it's corresponding distance, and (b) each instance of user activity that occurs within a one mile radius of promotion location 112 and having a type of "Purchase" may be identified as relevant and may be assigned a index value of "2" divided by it's corresponding distance. That is user activity corresponding to Visit IDs "5" and "8" may be excluded from consideration, while the relevant visits (e.g., corresponding to visit ID's "1"-"4", "6" and "7" may be assigned index values of "10" (e.g., 1/0.1), "1.25" (e.g., 1/0.08), "10" (e.g., 2/0.2), "3.33" (e.g., 1/0.3), "1.11" (e.g., 1/0.9) and "1.11" (e.g., 1/0.9), respectively. The index values may be totaled to provide an effectiveness index value of about "26.8".

Figure 8:
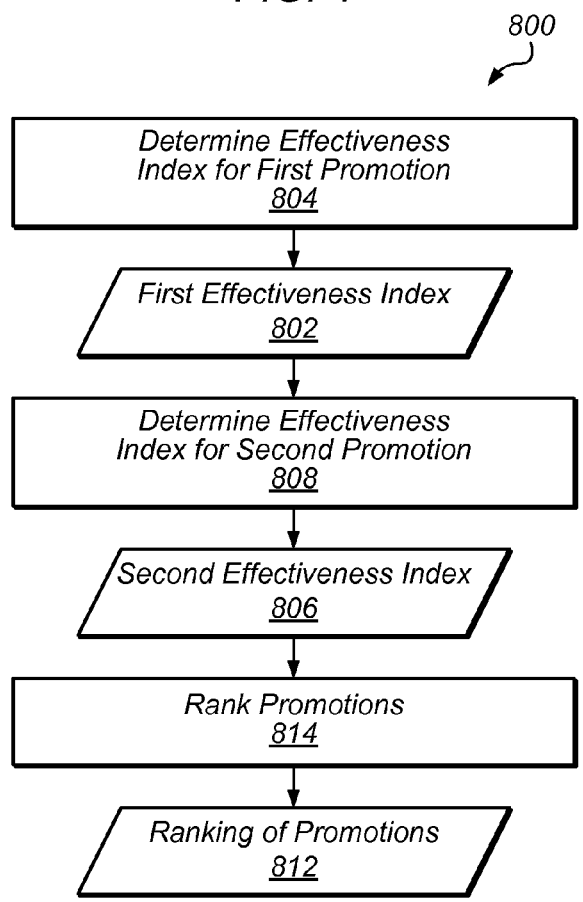
FIG. 8 is a flowchart that illustrates an exemplary method of assessing a relative effectiveness of multiple geographic locations of interest in accordance with one or more embodiments of the present technique.

Determination of effectiveness may include consideration of various other factors, as described below with respect to FIG. 8. Notably, the techniques for calculating an effectiveness index values may be varied to provide an effectiveness index that reflects goals of the promotions. For example, where it is more important that a promotion drive visits to a website, and less important that user make a purchase via the website, user activity including mere user visits may be given a higher weighting.

In some embodiments, the resulting effectiveness index 610 may be stored. For example effectiveness index 610 may be stored at a database (e.g., database 316). In some embodiments, effectiveness index 610 may be output. For example effectiveness index may be provided to a user for review (e.g., included in report 340a and/or 340b). In some embodiments, business decisions, such as whether or not to continue, expand, decrease or terminate a promotion may be based on the determined effectiveness. For example, promotions associated with a relatively high effectiveness index may be maintained, expanded in scale, duplicated or the like. Promotions associated with a relatively low effectiveness index may be terminated, improved, reduced in scale or the like.

It will be appreciated that method 600 is an exemplary embodiment of a method employed in accordance with techniques described herein. Method 600 may be may be modified to facilitate variations of its implementations and uses. Method 600 may be implemented in software, hardware, or a combination thereof. Some or all of method 600 may be implemented by effectiveness processing module 102. The order of method 600 may be changed, and various elements may be added, reordered, combined, omitted, modified, etc.

In some embodiments, it may be beneficial to compare the performance/effectiveness of multiple promotions. Such comparison may enable a marketer to gain a feel for the performance of promotions relative to one another. FIG. 8 is a flowchart that illustrates an exemplary method 800 of assessing the relative effectiveness of multiple geographic locations of interest (e.g., promotions at locations 112 and 112') in accordance with one or more embodiments of the present technique. Method 800 generally includes determining an effectiveness index for multiple promotions, and ranking the promotions based on the determined effectiveness indices.

Method 800 may include determining an effectiveness index 802 and 806 for first and second promotions, respectively, as depicted at blocks 804 and 808. In some embodiments, each of the first and second effectiveness indices may be determined using one or more of the techniques described above with respect to at least method 400 of FIG. 4. For example, data relevant to the calculation of the effectiveness index may be identified based on that falling within a bounded region, and/or relevant data may be weighted based on the activity type and/or activity location. In some embodiments, the effectiveness index for each promotion may be calculated using the same technique. For example, the first and second effectiveness indices 802 and 806 may each be calculated using the same bounding and weighting techniques. With regard to the map 700 of FIG. 7, in one exemplary embodiment, each instance of user activity that occurs within a one mile radius of promotion location 112 (e.g., within boundary 602) and associated with an activity type of "Visit" (represented by a square) may be identified as relevant to the calculation of first effectiveness index 802 for first promotion location 112 and may be assigned a index value of "1". Further, each instance of user activity that occurs within a one mile radius of promotion location 112 and associated with an activity type of "Purchase" (represented by a triangle) may be identified as relevant to the calculation of first effectiveness index 802 for first promotion location 112 and may be assigned an index value of "2". Using the same criteria for determining an effectiveness index 806 for second promotion location 112', each instance of user activity that occurs within a one mile radius of promotion location 112' (e.g., within boundary 602') and associated with an activity type of "Visit" (represented by a square) may be identified as relevant to the calculation of second effectiveness index 806 for second promotion location 112' and may be assigned a index value of "1", and each instance of user activity that occurs within a one mile radius of promotion location 112' and associated with an activity type of "Purchase" (represented by a triangle) may be identified as relevant to the calculation of second effectiveness index 806 for second promotion location 112' and may be assigned a index value of "2". The index values for each of the promotion locations 112 and 112' may be calculated by summing up the assigned index values for relevant activity corresponding thereto (e.g., activity that falls within the bounded region surrounding each location). For example, the index values for activity that occurred within boundary 602 may total to "7" and the index values for activity that occurred within boundary 602' may total to "8". Accordingly, first effective index 802 may be assigned a value of "7" and second effective index 806 may be assigned a value of "8". Effectiveness indices 802 and 806 may be output and/or stored (e.g., in database 316).

Determination of effectiveness may include consideration of various other factors. In some embodiments, an effectiveness index may be may be adjusted to account for external factors that may not be adequately reflected in the above effectiveness index determinations, such as the actual exposure of the locations/promotions to users). For example, where first promotion location 112 (having an effectiveness index of "7" as determined above) is located in a sparsely populated area having less exposure to the public and, where second promotion 112' (having an effectiveness index of "8" as determined above) is located in a highly populated area having less exposure to the public, the effectiveness indices may be adjusted to reflect their effectiveness based on the population/exposure. Where promotion location 112 is expected to have one-half the amount of exposure of location 112' (e.g., one-hundred people pass by location 112 and two-hundred pass by location 112'), the effectiveness index may be appropriately adjusted. For example, the effectiveness index may be divided by the expected exposure to reflect effectiveness per capita. That is, an effectiveness of location 112 may be assessed as 0.07 per persons exposed (e.g., 7 index/100 persons exposed) and an effectiveness of location 112' may be assessed as 0.04 per person (e.g., 8 index/200 persons exposed).

Method 800 may include ranking promotions, as depicted at block 814. In some embodiments, raking promotions may include ranking the promotions based on one or more determined effectiveness index values corresponding to the respective promotions. For example, based on the unadjusted effectiveness indices 802 and 806, the second billboard promotion at location 112' may be ranked above the first billboard promotion at location 112, and based on the adjusted effectiveness indices 802 and 806, the second billboard promotion at location 112' may be ranked below the first billboard promotion at location 112. Notably, the techniques for calculating an effectiveness index values may be varied to provide a ranking that reflects goals of the promotions. For example, where it is more important that a promotion drive visits to a website, and less important that user make a purchase via the website, user activity including mere user visits may be given a higher weighting.

In some embodiments, a ranking of promotions 812 is generated. The ranking of promotions 812 may be stored (e.g., at database 316). In some embodiments, ranking of promotions 812 may be output. For example ranking of promotions 812 may include a ranked listing of promotion locations and/or promotions provided to a user for review (e.g., included in report 340a and/or 340b). In some embodiments, business decisions, such as whether or not to continue, expand, decrease or terminate a promotion may be based on the ranking of promotions 812. For example, a promotion ranked highly according to ranking 812 may be maintained, expanded in scale, duplicated or the like. A lower ranked promotion may be terminated, improved, reduced in scale or the like.

It will be appreciated that method 800 is an exemplary embodiment of a method employed in accordance with techniques described herein. Method 800 may be may be modified to facilitate variations of its implementations and uses. Method 800 may be implemented in software, hardware, or a combination thereof. Some or all of method 800 may be implemented by effectiveness processing module 102. The order of method 800 may be changed, and various elements may be added, reordered, combined, omitted, modified, etc.

Exemplary Computer System

Figure 9:
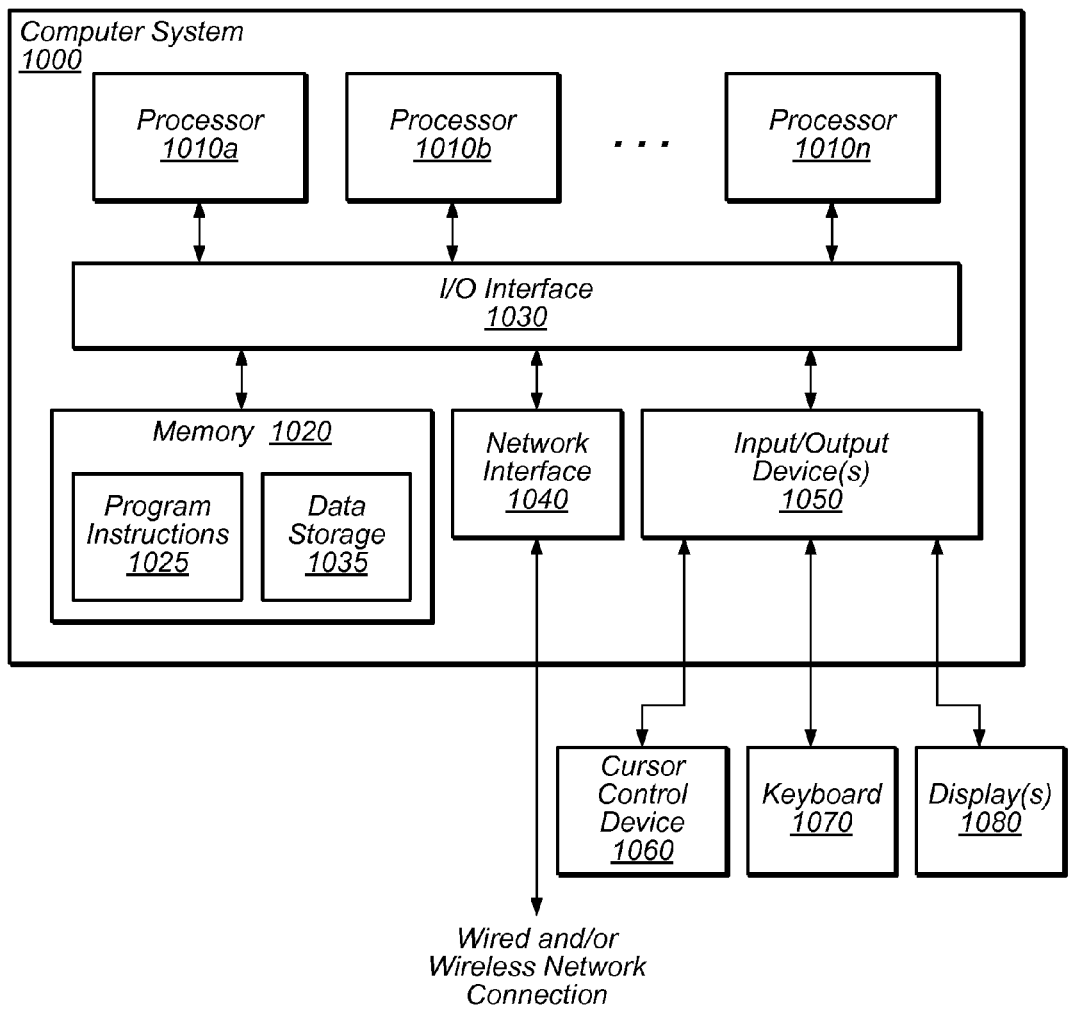
FIG. 9 is a diagram that illustrates an exemplary computer system in accordance with one or more embodiments of the present technique.

FIG. 9 is a diagram that illustrates an exemplary computer system 1000 in accordance with one or more embodiments of the present technique. Various portions of systems 100, 100', and/or 100" and/or methods 400 and/or 700 described herein, may be executed on one or more computer systems similar to that described herein, which may interact with various other devices of the system. For example, effectiveness processing module 102 may be executed on a computer system of analytics provider 204 or web analytics provider 300. Device 202 and/or client device 304 may include a computer device similar to that of computer system 1000.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for layout-preserved text generation may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a layout-preserved text generation method, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040. Program instructions may include instructions for implementing the techniques described with respect to method 500.

In some embodiments, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network (e.g., network 108), such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Memory 1020 may include program instructions 1025, configured to implement embodiments of a layout-preserved text generation method as described herein, and data storage 1035, comprising various data accessible by program instructions 1025. In one embodiment, program instructions 1025 may include software elements of a layout-preserved text generation method illustrated in the above Figures. Data storage 1035 may include data that may be used in embodiments, for example input PDF documents or output layout-preserved text documents. In other embodiments, other or different software elements and/or data may be included.

Those skilled in the art will appreciate that computer system 1000 is merely illustrative and is not intended to limit the scope of a layout-preserved text generation method as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations. In some embodiments, portions of the techniques described herein (e.g., preprocessing of script and metadata may be hosted in a cloud computing infrastructure.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Various modifications and changes may be to the above technique made as would be obvious to a person skilled in the art having the benefit of this disclosure. It is intended that the invention embrace all such modifications and changes and, accordingly, the above description to be regarded in an illustrative rather than a restrictive sense. While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

What is claimed is:

1. A method for assessing effectiveness of a promotion, comprising:
   determining by an analytics server a promotion location indicating a geographic location of a promotion;
   accessing by the analytics server an analytics dataset comprising activity data indicating that a plurality of users have accessed content associated with the promotion and location data indicating a plurality of user locations, each corresponding to a geographic location of a user when the user accessed the content, wherein the content is hosted on a content server and is accessed by the users by way of access devices communicatively coupled via a network to the content server;
   filtering the analytics dataset to identify a subset of the activity data and a subset of the location data indicating that a subset of the users accessed the content from a subset of the user locations that are within a specified proximity to the promotion location and during a specified time period;
   determining, by the analytics server, an effectiveness index for the promotion based at least in part on a quantity of the users who accessed the content from the subset of the user locations during the specified time period; and
   storing the effectiveness index in a memory of the analytics server.

2. The method of claim 1, wherein the promotion comprises a visual display, a billboard, a sign/banner, an in-store display, and/or an audible presentation.

3. The method of claim 1, wherein the geographic location of the user corresponds to a geographic location of an access device used by the user to access the content.

4. The method of claim 3, wherein the location data is transmitted to the analytics server for inclusion in the analytics dataset in response to the access device accessing the content.

5. The method of claim 3, wherein the access device comprises a wireless portable electronic communications device.

6. The method of claim 3, wherein the location data is transmitted via a web beacon request to the analytics server.

7. The method of claim 1, wherein the content comprises a website.

8. The method of claim 1, wherein the effectiveness index is based at least in part on a type of the content.

9. The method of claim 1, further comprising:
   determining a plurality of effectiveness indices, each for one of a plurality of promotions;

ranking the plurality of promotions with respect to one another using the effectiveness indices; and generating a report indicative of the ranking of the plurality of promotions.

10. The method of claim 9, wherein the report comprises a visual mapping, comprising:
   a representation of the geographic location of each of the promotions; and
   a representation of the subset of user locations identified for each the promotions by way of the filtering step.

11. The method of claim 1, further comprising:
   receiving a user selection of at least one of a region of interest, the specified proximity and the specified time period; and
   wherein the promotion location is within the region of interest.

12. The method of claim 11, wherein receiving the user selection of the region of interest comprises receiving a user defined boundary via user interaction with a graphical user interface.

13. The method of claim 1, wherein the effectiveness index for the promotion is determined based at least in part on a weighting of the subset of user locations according to their respective proximities to the promotion location, wherein user locations closer to the promotion location are weighted greater than user locations farther from the promotion location.

14. A non-transitory computer readable storage medium storing computer-executable program instructions that when executed by a computer are configured to cause the computer to:
   determine a promotion location indicating a geographic location of a promotion;
   access an analytics dataset comprising activity data indicating that a plurality of users have accessed content associated with the promotion and location data indicating a plurality of user locations, each corresponding to a geographic location of a user when the user accessed the content, wherein the content is hosted on a content server and is accessed by the users by way of access devices communicatively coupled via a network to the content server;
   filter the analytics dataset to identify a subset of the activity data and a subset of the location data indicating that a subset of the users accessed the content from a subset of the user locations that are within a specified proximity to the promotion location and during a specified time period;
   determine an effectiveness index for the promotion based at least in part on a quantity of the users who accessed the content from the subset of the user locations during the specified time period; and
   store the effectiveness index in a memory.

15. The non-transitory computer readable storage medium of claim 14, wherein the effectiveness index for the promotion is determined based at least in part on a weighting of the subset of user locations according to their respective proximities to the promotion location, wherein user locations closer to the promotion location are weighted greater than user locations farther from the promotion location.

16. The non-transitory computer readable storage medium of claim 14, wherein the effectiveness index is based at least in part on a type of the content.

17. The non-transitory computer readable storage medium of claim 14, storing further computer-executable program instructions that when executed by the computer are configured to cause the computer to:
   determine a plurality of effectiveness indices, each for one of a plurality of promotions;
   rank the plurality of promotions with respect to one another using the effectiveness indices; and
   generate a report indicative of the ranking of the plurality of promotions.

18. A system, comprising:
   a processor; and
   an index processing module executable by the processor to:
      determine a promotion location indicating a geographic location of a promotion;
      access an analytics dataset comprising activity data indicating that a plurality of users have accessed content associated with the promotion and location data indicating a plurality of user locations, each corresponding to a geographic location of a user when the user accessed the content, wherein the content is hosted on a content server and is accessed by the users by way of access devices communicatively coupled via a network to the content server;
      filter the analytics dataset to identify a subset of the activity data and a subset of the location data indicating that a subset of the users accessed the content from a subset of the user locations that are within a specified proximity to the promotion location and during a specified time period;
      determine an effectiveness index for the promotion based at least in part on a quantity of the users who accessed the content from the subset of the user locations during the specified time period; and
      store the effectiveness index in a memory.

19. The system of claim 18, wherein the effectiveness index for the promotion is determined based at least in part on a weighting of the subset of user locations according to their respective proximities to the promotion location, wherein user locations closer to the promotion location are weighted greater than user locations farther from the promotion location.

20. The system of claim 18, wherein the effectiveness index is based at least in part on a type of the content.

21. The system of claim 18, wherein the index processing module is further executable by the processor to:
   determine a plurality of effectiveness indices, each for one of a plurality of promotions;
   rank the plurality of promotions with respect to one another using the effectiveness indices; and
   generate a report indicative of the ranking of the plurality of promotions.

* * * * *